United States Patent
Parekh et al.

(10) Patent No.: US 7,978,656 B2
(45) Date of Patent: Jul. 12, 2011

(54) SEQUENCE NUMBERING FOR DISTRIBUTED WIRELESS NETWORKS

(75) Inventors: Nileshkumar J. Parekh, San Diego, CA (US); Rajesh Kumar, San Diego, CA (US); Maksim (Max) Krasnyanskiy, San Diego, CA (US); Eric Hall, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/055,019

(22) Filed: Mar. 25, 2008

(65) Prior Publication Data

US 2008/0240107 A1    Oct. 2, 2008

Related U.S. Application Data

(60) Provisional application No. 60/908,049, filed on Mar. 26, 2007, provisional application No. 60/908,395, filed on Mar. 27, 2007.

(51) Int. Cl.
*H04L 12/28* (2006.01)
*H04L 12/56* (2006.01)
(52) U.S. Cl. .................................. 370/331; 370/394
(58) Field of Classification Search .................. None
See application file for complete search history.

(56) References Cited

U.S. PATENT DOCUMENTS

| 6,999,434 B1 * | 2/2006 | Agrawal et al. ............... 370/331 |
| 2003/0157927 A1 * | 8/2003 | Yi et al. .......................... 455/411 |
| 2003/0224786 A1 * | 12/2003 | Lee et al. ..................... 455/432.1 |

FOREIGN PATENT DOCUMENTS

| EP | 1320274 | 6/2006 |
| WO | 2006089204 | 8/2006 |
| WO | 2008001187 | 1/2008 |

OTHER PUBLICATIONS

International Search Report—PCT/US2008/058309, International Searching Authority—European Patent Office—Sep. 29, 2008.
Written Opinion—PCT/US2008/058309, International Searching Authority—European Patent Office—Sep. 29, 2008.

* cited by examiner

*Primary Examiner* — Chirag G Shah
*Assistant Examiner* — Minh-Trang Nguyen
(74) *Attorney, Agent, or Firm* — Donald C. Kordich

(57) ABSTRACT

Systems and methodologies are described that facilitate maintaining consistent radio-link layer protocol (RLP) sequence numbers in the event of an RLP sequence number reset. An offset can be adjusted upon occurrence of the event to reflect a subsequent expected sequence number. The offset can be added to the RLP sequence numbers such that receiving devices and/or higher layer applications can operate without realizing the sequence number reset. Additionally, the offset can be synchronized among base stations to facilitate operability following handoff of the receiving device.

21 Claims, 9 Drawing Sheets

SEQUENCE NUMBERING FOR DISTRIBUTED WIRELESS NETWORKS

CROSS-REFERENCE TO RELATED APPLICATIONS

This application claims the benefit of U.S. Provisional Patent application Ser. No. 60/908,049 entitled "SYSTEM AND METHOD FOR DETERMINING SEQUENCE NUMBERING" which was filed Mar. 26, 2007 and U.S. Provisional Patent application Ser. No. 60/908,395 entitled "SYSTEM AND METHOD FOR DETERMINING SEQUENCE NUMBERING" which was filed Mar. 27, 2007. The entireties of the aforementioned applications are herein incorporated by reference.

BACKGROUND

I. Field

The following description relates generally to wireless communications, and more particularly to providing sequence numbering in wireless networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally; the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multi-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Additionally, mobile devices can move throughout communications sectors served by one or more base stations, and the mobile devices can be handed off between the base stations to facilitate communicating with a desirable base station regardless of location. Radio-link layer protocol (RLP) has evolved to allow such mid-transmission handoff where a target base station can continue a transmission begun by a source sector following handoff using virtual RLP (VRLP) sequence numbers.

Using VRLP, pointers can be transmitted with handoff requests to indicate where buffered communication terminated in the source sector. The target sector, following handoff, can utilize the pointer and the remaining buffer to continue transmitting remaining data in the buffer. In this regard, over-the-air (OTA) RLP sequence numbers can be mapped to virtual sequence numbers so that the change in numbers does not completely disrupt the communication following handoff, and sectors can maintain coordinated packet sequencing.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with providing sequence numbering that remains consistent in events that can reset sequence numbering. Such events can include reset of the over-the-air (OTA) radio-link layer protocol (RLP), wrap-around of the numbers where the sequence number reaches a maximum for the size allowed and resets to an initial number, and/or the like. This can be accomplished at least in part by establishing an offset that is set to a subsequent sequence number prior to OTA RLP reset, wrap-around, and/or the like. The offset can be utilized in the sequence numbering reset events to continue the numbering as if the reset did not occur. Additionally, the offset can be propagated to various base stations and/or transmitted as part of a handoff request to ensure source base stations have the offset to utilize in such events.

According to related aspects, a method that facilitates maintaining consistent sequence space in RLP communications is provided. The method can comprise detecting an RLP sequence number reset event and setting an offset substantially equal to an RLP sequence number succeeding a current RLP number upon occurrence of the detected event. The method can further comprise adding the offset to subsequent RLP sequence numbers prior to transmitting respective RLP data with the subsequent RLP sequence numbers.

Another aspect relates to a wireless communications apparatus. The wireless communications apparatus can include at least one processor configured to maintain a consistent RLP sequence number space throughout one or more RLP sequence number reset events. The wireless communications apparatus can also include a memory coupled to the at least one processor.

Yet another aspect relates to a wireless communications apparatus that facilitates maintaining consistent sequence space in RLP communications. The wireless communications apparatus can include means for determining an RLP sequence number reset event and means for adjusting an offset based upon occurrence of the determined RLP sequence number reset event. The wireless communications apparatus can further include means for adding the offset to subsequent RLP sequence numbers prior to transmitting respective RLP data with the subsequent RLP sequence numbers.

Still another aspect relates to a computer program product, which can have a computer-readable medium including code for causing at least one computer to detect an RLP sequence number reset event. The computer-readable medium can further comprise code for causing the at least one computer to set an offset substantially equal to an RLP sequence number succeeding a current RLP number upon occurrence of the detected event. Moreover, the computer-readable medium can include code for causing the at least one computer to add the offset to subsequent RLP sequence numbers prior to transmitting respective RLP data with the subsequent RLP sequence numbers.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
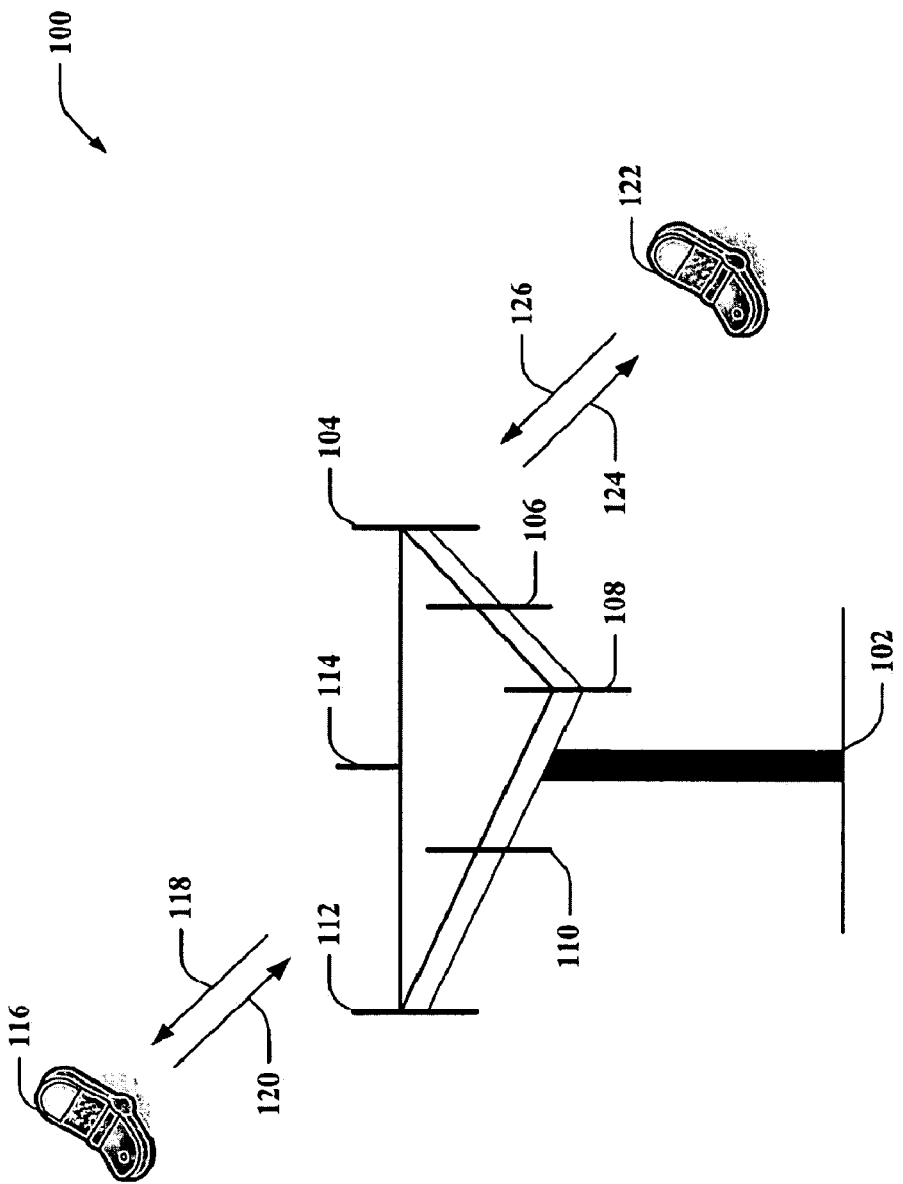
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which, employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. The base station 102 can utilize radio-link layer protocol (RLP) to communicate on a physical layer with the one or more mobile devices 116 and/or 122. Furthermore, the base station 102 can participate in a wireless communication network where the mobile devices 116 and/or 122 can be handed off between base station 102 and oilier base stations (not shown). In this regard, the base station 102 can utilize virtual RLP (VRLP) to map over-the-air (OTA) RLP sequence numbers to virtual sequence numbers for maintaining packet sequencing among base stations. In one example, pointer locations can be transmitted during handoff such that the target base station for the handoff can continue communication where the source left off.

In addition, the base station 102 can employ an offset to maintain consistent VRLP sequencing space during events that can reset the OTA RLP sequence numbers, such as reset of the OTA RLP, wrap-around of the RLP sequence numbers and/or the like. In this regard, the reset of sequence numbers can occur seamlessly to base stations 102, mobile devices 116 and 122, and/or higher level applications thereof. The offset can be initialized and/or updated upon occurrence of the event causing reset of the OTA RLP sequence numbers. Thus, the offset can be added to subsequent sequence numbers as if the reset did not occur. The offset can be maintained across handoffs as well by transmitting the offset to disparate base stations receiving the handoff request (e.g., as part of the handoff request, a separate transmission, propagation of the offset according to a time interval or on occurrence of reset events, etc.). In this way, the sequence numbers can appear to be uninterrupted according to one or more higher level applications of the base station 102, disparate base station(s), and/or mobile devices 116/122.

Figure 2:
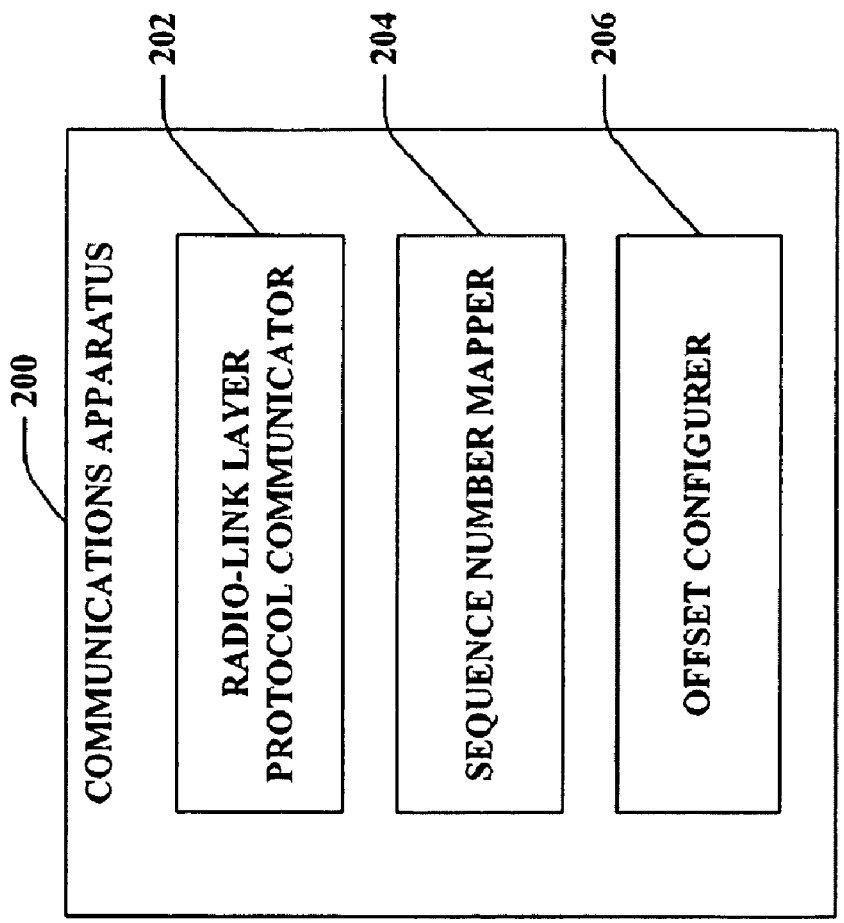
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In particular, the communications apparatus 200 can be an access point that provides wireless communication services to a requesting device. The communications apparatus 200 can include an RLP communicator 202 that can communicate data over a radio-link with one or more disparate devices, a sequence number mapper 204 that can map RLP sequence numbers to VRLP numbers allowing communication handoff between disparate communications apparatuses without interrupting sequence numbers in higher level applications, and an offset configurer 206 that can maintain an offset variable upon occurrence of a OTA RLP sequence number reset.

According to an example, the RLP communicator 202 can communicate on a radio-link layer with one or more disparate devices, such as an access terminal and the like. The communication can entail transmitting and/or receiving data below an application and/or internet protocol (IP) layer. The data can be communicated as one or more numbered frames comprising the data where handoff can occur mid-frame or between frames of a portion of data. The handoff can cause the RLP communication with communications apparatus 202 to be interrupted for RLP communication with a disparate communications apparatus (not shown). As mentioned, the handoff can be caused by an access terminal coming in closer range of the disparate communications apparatus, in one example. Additionally, the access terminal can be communicating with a disparate communications apparatus and can come within closer range of the communications apparatus 200 causing handoff of communication to the communications apparatus 200.

The communications apparatus 200 can receive a VRLP sequence number to continue communication of data to the access terminal where the previous disparate communications apparatus left off. This allows the communications apparatuses to coordinate packet sequencing. For example, the sequence number mapper 204 can utilize the VRLP sequence number when transmitting data to the access terminal to provide seamless handoff thereto. Thus, utilizing the sequence number mapper 204 to map the physical RLP sequence number to the VRLP received allows the receiving device (e.g., the access terminal) to receive communications from various communications apparatuses without realizing effects of handoff.

In the event of reset of OTA RLP sequence numbers within a communications apparatus 200, the offset configurer 206 can be utilized to initialize an offset related to the sequence numbers allowing seamless communication with disparate access terminals. For example, the OTA RLP sequence numbers can reset in certain events, including but not limited to reset of the OTA RLP itself, wrap-around of the sequence numbers where the current number is at the end of an available maximum, and/or the like. Upon the occurrence of the event, the offset configurer 206 can initialize or update an offset variable with the last or predicted next sequence number. Subsequent transmissions can modify the VRLP sequence number by the offset to maintain consistent sequence numbers with respect to higher level applications. Moreover, upon modification or initialization of the offset, the offset can be synchronized among disparate communications apparatuses 200 to maintain the sequence space across handoffs as well. In another example, the offset can be transmitted during handoff, upon notification of handoff possibility, and/or the like.

Figure 3:
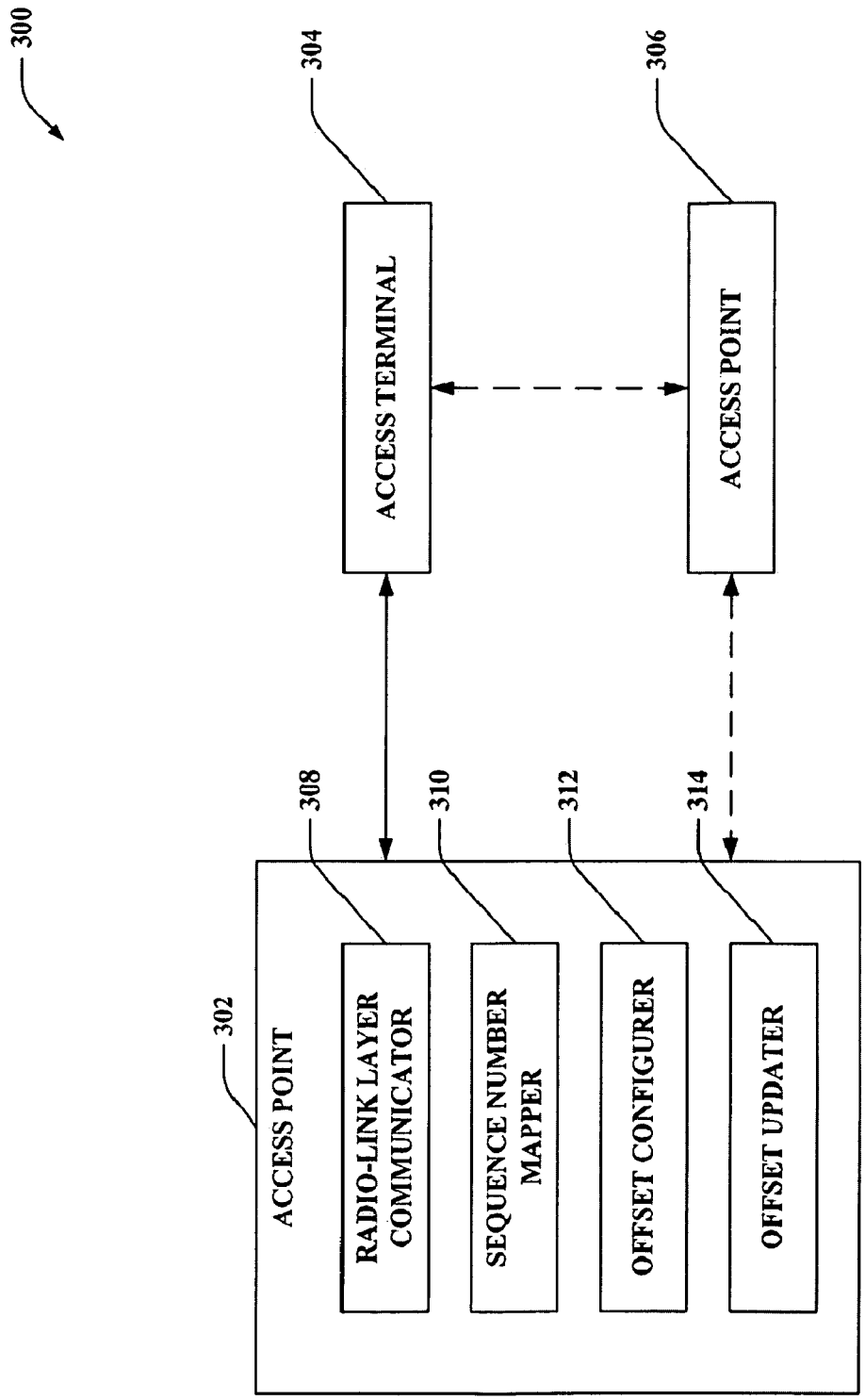
FIG. 3 is an illustration of an example wireless communications system that effectuates maintaining consistent sequence space numbering.

Now referring to FIG. 3, illustrated is a wireless communications system 300 that can facilitate utilizing an offset to facilitate seamless VRLP sequence space in wireless communications networks. The system 300 includes an access point 302 that can communicate with an access terminal 304 (and/or any number of disparate devices (not shown)). The access point 302 can transmit information to the access terminal 304 over a forward link channel, further access point 302 can receive information from the access terminal 304 over a reverse link channel. Another access point 306 is provided to/from which access terminal 304 can be handed off. Moreover, system 300 can be a MIMO system. Additionally, the system 300 can operate in an OFDMA wireless network (such as 3GPP, 3GPP2, 3GPP LTE, etc., for example). Also, the components and functionalities shown and described below in the access point 302 can be present in the access point 306, in one example.

The access point 302 includes a radio-link layer communicator 308 that can communicate data over a radio-link layer with one or more access terminals, a sequence number mapper 310 that can associate a physical RLP sequence number with a VRLP number for seamless handoff of access terminals between the access points 302 and/or 306, an offset configurer 312 that can initialize, modify, or otherwise update an offset to be applied to the VRLP number, and an offset updater 314 that can synchronize an offset with one or more disparate access points, such as access point 306. Such updating can be performed as part of a handoff request, on occurrence of an even that causes modification of the offset, and/or the like.

According to an example, the access point 302 can communicate with the access terminal 304 over a radio-link layer using the radio-link layer communicator 308. This layer can utilize sequence numbers to ensure ordered receipt of data frames. Higher level applications can utilize the sequence numbers, in one example, to interpret the data frames as sequential data according to the numbers. The numbers can be specified at the RLP layer. However, the numbers at the RLP layer can change; thus, the sequence number mapper 310 can be utilized to associate a VRLP number with the RLP number in instances of handoff, for example, to coordinate packet sequencing between access points (e.g., access points 302 and 306). For instance, where the access terminal 304 is communicating with the access point 306, communication can be handed off to the access point 302 as mentioned above. The sequence number mapper 310 can associate a VRLP sequence number of the access point 302 with the next number expected by the access terminal 304 (e.g., the next number the access point 306 would have used if handoff did not occur). In this regard, sequence number disparities are not realized by the access terminal 304 or higher level applications.

In addition, the offset configurer 312 can define an offset that can be added to the VRLP sequence number to facilitate consistent sequence space where the RLP sequence numbers for the access point can be reset. For example, the RLP sequence numbers can be reset where the OTA RLP for the access point 302 resets, sequence numbers wrap-around, and/or the like. In this event, for example, the offset configurer 312 can hold an offset number related to an expected subsequent sequence number. Thus, when RLP sequence numbers reset, the offset can be added to the numbers as if the numbers were not reset according to the receiving device (e.g., access terminal 304). The offset configurer 312 can modify the offset variable upon each sequence number reset event, for example. Additionally, the offset updater 314 can be utilized to notify disparate access points (e.g., access point 306) of the change in offset to ensure synchronization of the offset between access points for efficient handoff. In this regard, the offset can be maintained across multiple access points such that change in RLP numbers need not be realized by higher level applications or disparate devices, such as access terminal 304, in the event of number reset at the current access point, handoff, or a combination thereof.

As shown, access terminal 304 can be communicating with the access point 302 using RLP where the sequence number mapper 310 can provide VRLP sequence numbers with communications to the access terminal 304 to maintain consistent packet sequencing. For example, the access point 302 can continue communication from a disparate access point from which the access terminal 304 was handed off. Upon an RLP sequence number resetting event, such as OTA RLP reset, sequence number wrap-around, etc., the offset configurer 312 can set an offset variable equal to the next VRLP number. Upon subsequent RLP communication, the offset can be added to the initial VRLP number. Thus, the VRLP numbers do not reset as a result of the RLP number reset maintaining a consistent sequence space regardless of such events, and accordingly, higher level applications need not realize such events. Additionally, the offset updater 314 can synchronize an offset in the access point 306 to allow consistency when handing off the access terminal 304 to the access point 306. Thus, following handoff to the access point 306, the offset can be utilized in communicating with the access terminal 304 so the access terminal does not realize difference in sequence numbers.

Figure 4:
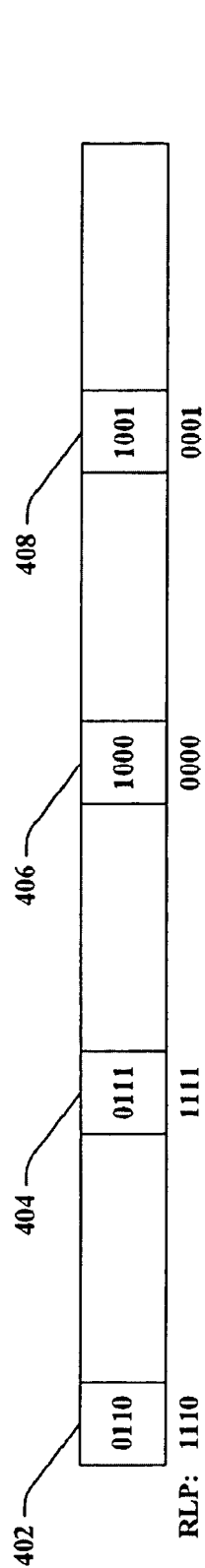
FIG. 4 is an illustration of example radio-link layer protocol (RLP) data portions with appended sequence numbers and respective RLP numbers.

Now referring to FIG. 4, example RLP communication frames 400 are shown for communicating data in wireless networks. RLP can specify sequence numbers to utilize in transmitting data as described above. As shown, the frames can begin with the sequence number, in one example. In this example, the sequence numbers shown at 402, 404, 406, and 408 can be VRLP sequence numbers, due to a handoff or the like, where the corresponding RLP sequence number utilized by the access point is shown below the VRLP sequence number. Though shown as 4-bit sequence numbers, it is to be appreciated that substantially any number of sequence numbers can be utilized having substantially any maximum before wrap-around. In this regard, upon receiving the frames, the receiving device can sequentially order the frames according to the sequence numbers at 402, 404, 406, and 408 to interpret the data.

As shown, the RLP numbers can wrap-around at 406 from 1111 to 0000. This event, as described, can cause the offset to be configured for the VRLP sequence numbers. As described, the offset can be the next expected VRLP sequence number, 1000 shown at 406. Thus, at 406, the offset 1000 can be added to the RLP sequence number 0000, to yield 1000 for the VRLP with offset. Subsequently, at 408, the offset 1000 can be added to the sequence number 0001 to yield 1001 and so on. In this regard, receiving devices and/or higher level applications do not realize the number reset. Additionally, the available VRLP numbers can be greater than RLP numbers allowing the offset to compensate for difference in the numbers upon wrap-around. Also, reset of OTA RLP, as described above, can cause the offset to be set.

Figure 5:
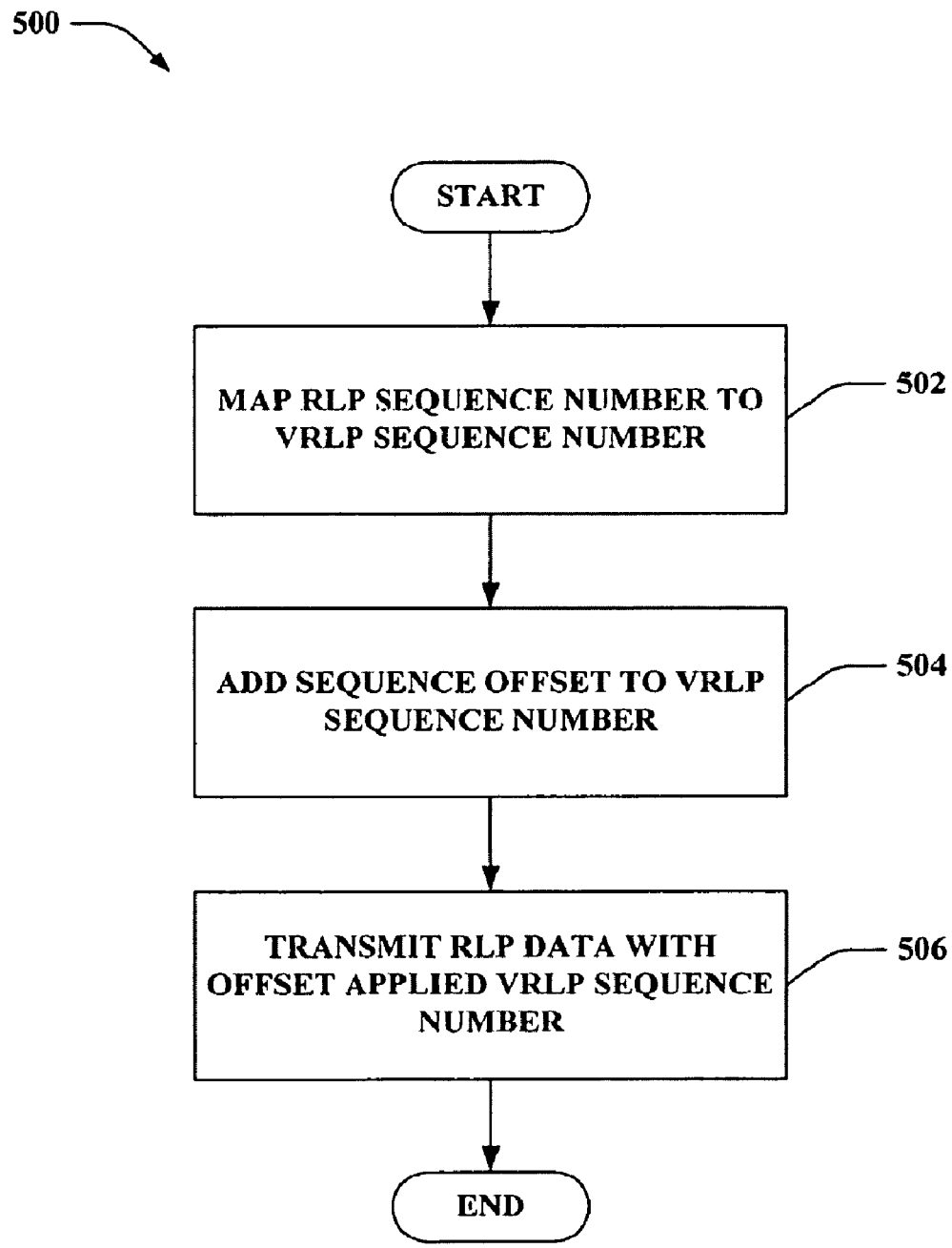
FIG. 5 is an illustration of an example methodology that facilitates adjusting sequence numbers according to an offset.
Figure 6:
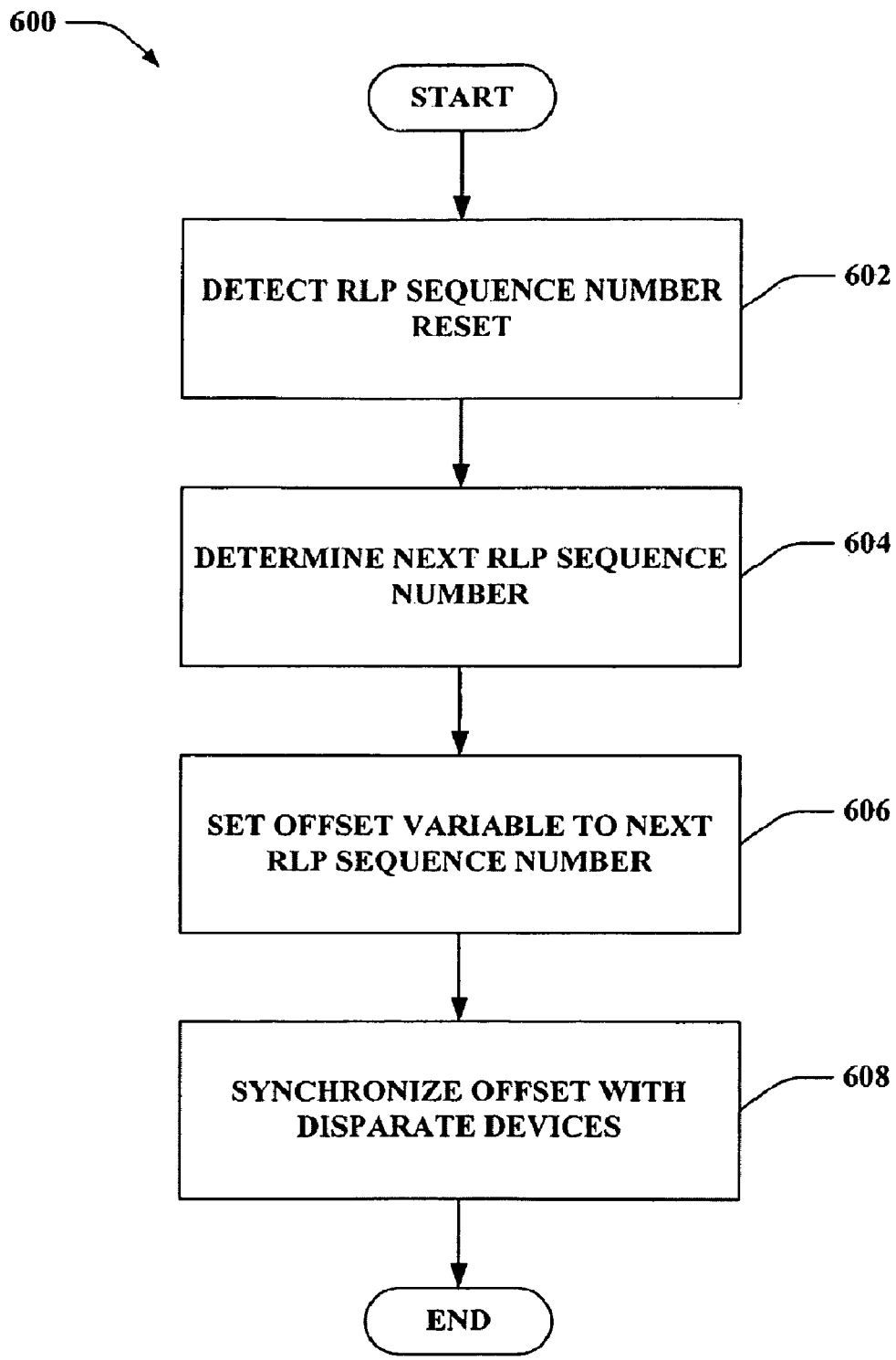
FIG. 6 is an illustration of an example methodology that facilitates setting an offset according to a sequence number reset event.

Referring to FIGS. 5-6, methodologies relating to maintaining consistent sequence numbers using an offset for reset events are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates transmitting consistent RLP sequence numbers over RLP number reset events. At 502, an RLP sequence number can be mapped to a VRLP sequence number. In one example, this can allow the sequence numbers to be extended or account for handing off communications by maintaining a substantially 1:1 mapping of VRLP sequence numbers to RLP sequence numbers. At 504, the sequence offset can be added to the VRLP sequence number. As described, the offset can be assigned a value related to an RLP sequence number reset event, such as reset of the OTA RLP, sequence number wrap-around, and/or the like. In one example, the value can be equal to a subsequent expected frame number, and the number can be added to the reset RLP sequence numbers such that the reset had not occurred. Thus, at 506, RLP data can be transmitted with the offset applied to the VRLP sequence number.

Now referring to FIG. 6, a methodology 600 that facilitates setting an offset for maintaining consistent RLP sequence space is illustrated. At 602, an RLP sequence number reset is detected. The detection can occur by evaluating the RLP sequence numbers, notification of the event, inferring the event based on one or more disparate events, etc. At 604, the next RLP sequence number can be determined. This can be the next RLP sequence number that would have been expected if not for the reset event, in one example. At 606, an offset variable can be set to the determined next RLP sequence number such that adding the number to subsequent RLP numbers following the reset can appear as if the reset had not occurred. At 608, the offset can be synchronized with disparate devices or access points, such as by transmitting the offset to the devices, to a common network node, and/or the like based at least in part on a request, notification, and/or the like. It is to be appreciated that the RLP sequence numbers can be VRLP sequence numbers mapped to underlying RLP sequence numbers as well.

It will be appreciated that, in accordance with one or more aspects described herein, inferences can be made regarding detecting RLP sequence number reset events as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
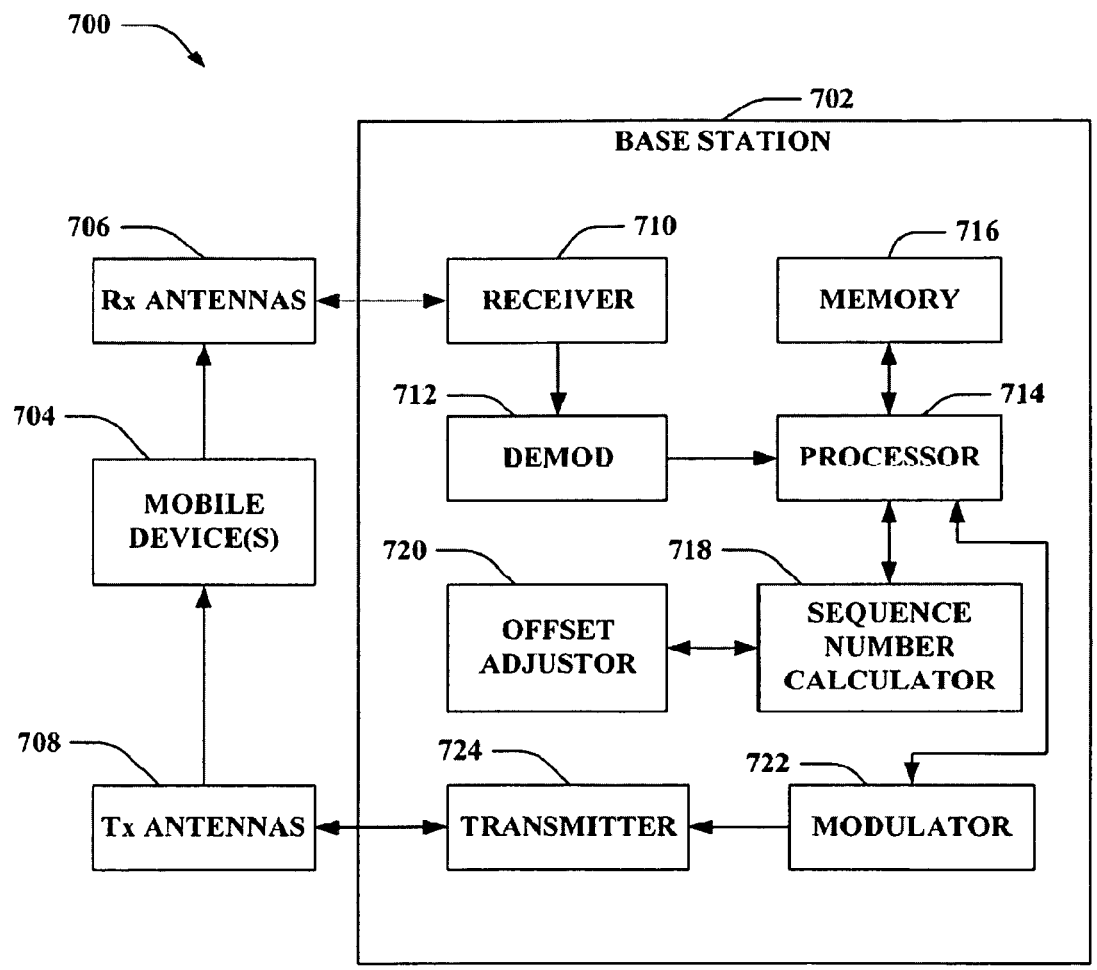
FIG. 7 is an illustration of an example system that facilitates utilizing an offset in assigning sequence numbers.

FIG. 7 is an illustration of a system 700 that facilitates adjusting and applying an offset to an RLP sequence number space. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 can be a processor dedicated to analyzing information received by receiver 710 and/or generating information for transmission by a transmitter 724, a processor that controls one or more components of base station 702, and/or a processor that both analyzes information received by receiver 710, generates information for transmission by transmitter 724, and controls one or more components of base station 702.

Base station 702 can additionally comprise memory 716 that is operatively coupled to processor 714 and that can store data to be transmitted, received data, information related to available channels, data associated with analyzed signal and/or interference strength, information related to an assigned channel, power, rate, or the like, and any other suitable information for estimating a channel and communicating via the channel. Memory 716 can additionally store protocols and/or algorithms associated with estimating and/or utilizing a channel (e.g., performance based, capacity based, etc.).

It will be appreciated that the memory 716 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate. SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 714 is further coupled, to a sequence number calculator 718 that can compute sequence numbers for transmitting RLP data. For example, the sequence numbers can be based at least in part on underlying RLP numbers and can have an added offset to maintain consistency in sequence number reset events. The processor can also be coupled to an offset adjustor 720 that maintains the offset. For example, in the event of ah RLP sequence number reset, the offset adjustor 720 can set the offset to a subsequent expected sequence number. Upon RLP sequence number reset, the sequence number calculator 718 can add the offset to the sequence numbers before transmitting RLP data such that the reset event is not recognized by receiving devices, such as mobile device(s) 704. Furthermore, although depicted as being separate from the processor 714, it is to be appreciated that the sequence number calculator 718, offset adjustor 720, demodulator 712, and/or modulator 722 can be part of the processor 714 or multiple processors (not shown).

Figure 8:
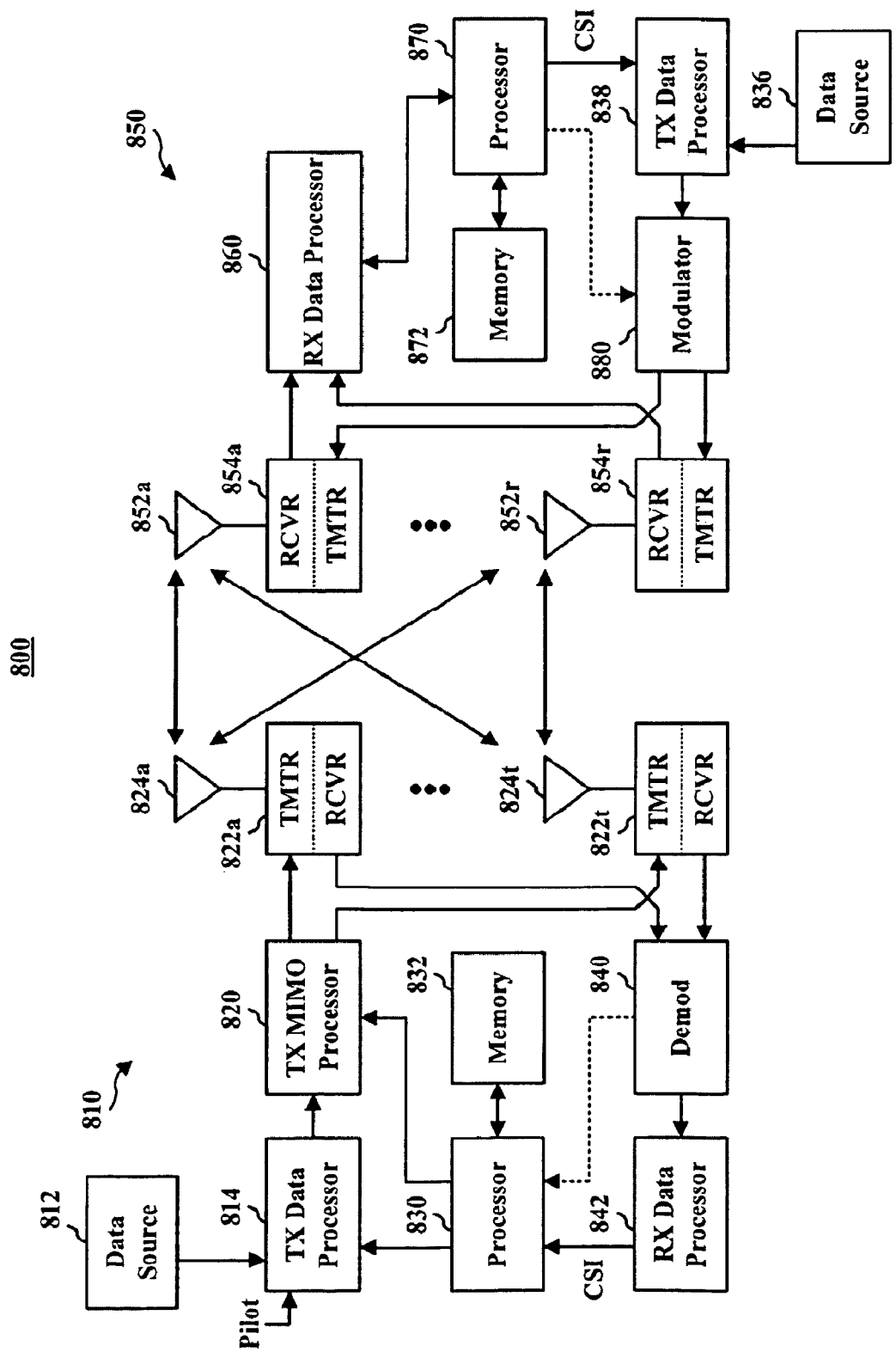
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 7), examples (FIG. 4) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
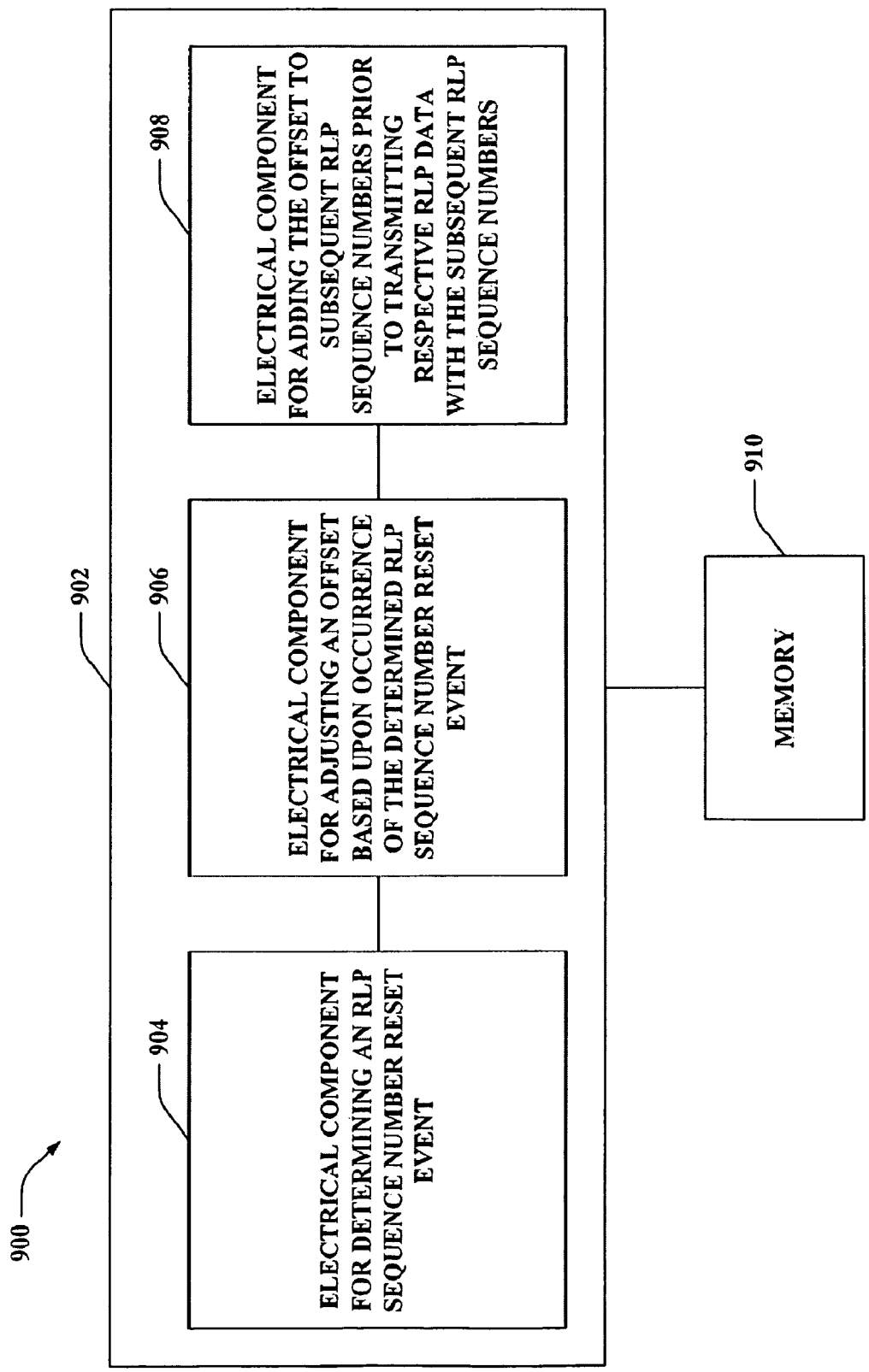
FIG. 9 is an illustration of an example system that maintains consistent sequence numbers using an offset to account for sequence number reset.

With reference to FIG. 9, illustrated is a system 900 that facilitates maintaining a consistent sequence number space in wireless networks. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for determining an RLP sequence number reset event 904. For example, the event can be a reset of the OTA RLP, sequence number wrap-around, and/or the like. The event can be determined by evaluating the numbers, monitoring one or more aspects of the system 900, etc. Further, logical grouping 902 can comprise an electrical component for adjusting an offset based upon occurrence of the determined RLP sequence number reset event 906. In one example, the offset can be updated to a sequence number succeeding the reset event such that adding the offset to reset sequence numbers can maintain consistency in the numbers. Moreover, logical grouping 902 can comprise an electrical component for adding the offset to subsequent RLP sequence numbers prior to transmitting respective RLP data with the subsequent RLP sequence numbers 908. Thus, as mentioned, RLP data can be transmitted maintaining consistent sequence numbers in the event of a sequence number reset. Additionally, system 900 can include a memory 910 that retains instructions for executing functions, associated with electrical components 904, 906, and 908. While shown as being external to memory 910, it is to be understood that one or more of electrical components 904, 906, and 908 can exist within memory 910.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates maintaining consistent sequence space in radio-link layer protocol (RLP) communications, comprising:
   detecting one or more RLP sequence number reset events, wherein at least one of the one or more RLP sequence number reset events is a wrap-around of RLP sequence numbers;
   setting an offset substantially equal to an RLP sequence number succeeding a current RLP number upon occurrence of the one or more RLP sequence number reset events; and
   adding the offset to subsequent RLP sequence numbers prior to transmitting respective RLP data with the subsequent RLP sequence numbers, wherein the subsequent RLP sequence numbers are virtual RLP (VRLP) sequence numbers that are mapped to one or more underlying RLP sequence numbers, and wherein the VRLP sequence numbers do not reset as a result of the one or more RLP sequence number reset events.

2. The method of claim 1, wherein the one or more RLP sequence number reset events comprises an over the air (OTA) RLP reset.

3. The method of claim 1, wherein the current RLP number is a maximum RLP sequence number.

4. The method of claim 1, further comprising transmitting the offset to one or more access points.

5. The method of claim 1, further comprising resetting the offset according to an offset received from a disparate access point.

6. The method of claim 1, further comprising mapping the VRLP sequence numbers to the underlying RLP sequence numbers.

7. The method of claim 1, further comprising transmitting the subsequent RLP sequence numbers, added with the offset, with respective RLP data to one or more access terminals to maintain a consistent RLP sequence space with respect to the one or more access terminals.

8. A wireless communications apparatus, comprising:
   at least one processor configured to:
      maintain a consistent radio-link layer protocol (RLP) sequence number space throughout one or more RLP sequence number reset events, wherein at least one of the one or more RLP sequence number reset events is a wrap-around of RLP sequence numbers;
      set an offset substantially equal to an RLP sequence number related to the one or more RLP sequence number reset events; and
      add the offset to subsequent RLP sequence numbers to maintain the consistent RLP sequence number space, wherein the subsequent RLP sequence numbers are virtual RLP (VRLP) sequence numbers that are mapped to one or more underlying RLP sequence numbers, and wherein the VRLP sequence numbers do not reset as a result of the one or more RLP sequence number reset events; and
   a memory coupled to the at least one processor.

9. The wireless communications apparatus of claim 8, wherein at least one of the one or more RLP sequence number reset events is an over the air (OTA) RLP reset.

10. The wireless communications apparatus of claim 8, wherein a current RLP number is a maximum RLP sequence number.

11. The wireless communications apparatus of claim 8, the at least one processor is further configured to transmit the offset to one or more disparate wireless communications apparatuses.

12. The wireless communications apparatus of claim 8, the at least one processor is further configured to reset the offset according to an offset received from a disparate wireless communications apparatus.

13. The wireless communications apparatus of claim 8, the at least one processor further configured to map VRLP sequence numbers of the VRLP sequence number space to RLP sequence numbers of the underlying RLP sequence number space.

14. A wireless communications apparatus that facilitates maintaining consistent sequence space in radio-link layer protocol (RLP) communications, comprising:
means for determining one or more RLP sequence number reset events, wherein at least one of the one or more RLP sequence number reset events is a wrap-around of RLP sequence numbers;
means for adjusting an offset based upon occurrence of the one or more RLP sequence number reset events; and
means for adding the offset to subsequent RLP sequence numbers prior to transmitting respective RLP data with the subsequent RLP sequence numbers, wherein the subsequent RLP sequence numbers are virtual RLP (VRLP) sequence numbers that are mapped to one or more underlying RLP sequence numbers, and wherein the VRLP sequence numbers do not reset as a result of the one or more RLP sequence number reset events.

15. The wireless communications apparatus of claim 14, wherein at least one of the one or more RLP sequence number reset events is an over the air (OTA) RLP reset.

16. The wireless communications apparatus of claim 14, wherein a current RLP number is a maximum RLP sequence number.

17. The wireless communications apparatus of claim 14, further comprising means for transmitting the offset to one or more disparate wireless communications apparatuses.

18. The wireless communications apparatus of claim 14, further comprising means for re-adjusting the offset according to an offset received from a disparate wireless communications apparatus.

19. The wireless communications apparatus of claim 14, further comprising means for mapping the VRLP sequence numbers to the underlying RLP sequence numbers.

20. The wireless communications apparatus of claim 14, further comprising means for transmitting the subsequent RLP sequence numbers, added with the offset, with the respective RLP data to one or more access terminals to maintain a consistent RLP sequence space with respect to the one or more access terminals.

21. A non-transitory computer-readable medium storing a computer program, wherein execution of the computer program is for:
causing at least one computer to detect one or more radio-link layer protocol (RLP) sequence number reset events, wherein at least one of the one or more RLP sequence number reset events is a wrap-around of RLP sequence numbers;
causing the at least one computer to set an offset substantially equal to an RLP sequence number succeeding a current RLP number upon occurrence of the one or more RLP sequence number reset events; and
causing the at least one computer to add the offset to subsequent RLP sequence numbers prior to transmitting respective RLP data with the subsequent RLP sequence numbers, wherein the subsequent RLP sequence numbers are virtual RLP (VRLP) sequence numbers that are mapped to one or more underlying RLP sequence numbers, and wherein the VRLP sequence numbers do not reset as a result of the one or more RLP sequence number reset events.

* * * * *